(12) United States Patent
Jung et al.

(10) Patent No.: US 10,074,372 B2
(45) Date of Patent: *Sep. 11, 2018

(54) SPEECH RECOGNITION USING ELECTRONIC DEVICE AND SERVER

(71) Applicant: Samsung Electronics Co., Ltd., Suwon-si, Gyeonggi-do (KR)

(72) Inventors: Seok Yeong Jung, Yongin-si (KR); Kyung Tae Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,847

(22) Filed: Apr. 28, 2017

(65) Prior Publication Data

US 2017/0236519 A1 Aug. 17, 2017

Related U.S. Application Data

(63) Continuation of application No. 14/680,444, filed on Apr. 7, 2015, now Pat. No. 9,640,183.

(60) Provisional application No. 61/976,142, filed on Apr. 7, 2014.

(30) Foreign Application Priority Data

Mar. 20, 2015 (KR) .......................... 10-2015-0038857

(51) Int. Cl.
*G10L 15/00* (2013.01)
*G10L 15/30* (2013.01)
*G10L 15/22* (2006.01)
*G10L 15/08* (2006.01)

(52) U.S. Cl.
CPC .............. *G10L 15/30* (2013.01); *G10L 15/08* (2013.01); *G10L 15/22* (2013.01); *G10L 2015/223* (2013.01); *G10L 2015/225* (2013.01)

(58) Field of Classification Search
None
See application file for complete search history.

(56) References Cited

U.S. PATENT DOCUMENTS 7,502,737 B2   3/2009  Sharma et al.
7,657,433 B1 *  2/2010  Chang ..................... G10L 15/08
                                                  704/236

(Continued)

FOREIGN PATENT DOCUMENTS

CN   101567189 A   10/2009
CN   102543071 A    7/2012

(Continued)

*Primary Examiner* — Satwant Singh
(74) *Attorney, Agent, or Firm* — Jefferson IP Law, LLP

(57) ABSTRACT

An electronic device is provided. The electronic device includes a processor configured to perform automatic speech recognition (ASR) on a speech input by using a speech recognition model that is stored in a memory and a communication module configured to provide the speech input to a server and receive a speech instruction, which corresponds to the speech input, from the server. The electronic device may perform different operations according to a confidence score of a result of the ASR. Besides, it may be permissible to prepare other various embodiments speculated through the specification.

1 Claim, 8 Drawing Sheets

(56) References Cited

U.S. PATENT DOCUMENTS

| | | | |
|---|---|---|---|
| 8,180,641 B2* | 5/2012 | Levit | G10L 15/32 704/252 |
| 8,600,760 B2* | 12/2013 | Grost | G10L 15/08 704/240 |
| 9,093,076 B2* | 7/2015 | Fry | G10L 15/32 |
| 9,640,183 B2* | 5/2017 | Jung | G10L 17/22 |
| 2003/0236664 A1 | 12/2003 | Sharma | |
| 2006/0149544 A1* | 7/2006 | Hakkani-Tur | G10L 15/22 704/236 |
| 2006/0293886 A1* | 12/2006 | Odell | G10L 15/08 704/231 |
| 2008/0243502 A1* | 10/2008 | Ativanichayaphong | G10L 15/193 704/240 |
| 2009/0204409 A1 | 8/2009 | Mozer et al. | |
| 2009/0204410 A1 | 8/2009 | Mozer et al. | |
| 2010/0057450 A1 | 3/2010 | Koll | |
| 2010/0100377 A1* | 4/2010 | Madhavapeddi | G10L 15/22 704/235 |
| 2011/0238415 A1 | 9/2011 | Koll | |
| 2012/0179457 A1 | 7/2012 | Newman et al. | |
| 2012/0179463 A1 | 7/2012 | Newman et al. | |
| 2012/0179464 A1 | 7/2012 | Newman et al. | |
| 2012/0179469 A1 | 7/2012 | Newman et al. | |
| 2012/0179471 A1 | 7/2012 | Newman et al. | |
| 2012/0296644 A1* | 11/2012 | Koll | G10L 15/30 704/231 |
| 2013/0085753 A1 | 4/2013 | Bringert et al. | |
| 2013/0179154 A1 | 7/2013 | Okuno | |
| 2013/0317820 A1* | 11/2013 | Xiao | G10L 15/01 704/236 |
| 2015/0302851 A1* | 10/2015 | Talwar | G10L 15/24 704/254 |

FOREIGN PATENT DOCUMENTS

| | | |
|---|---|---|
| EP | 2 613 314 A1 | 7/2013 |
| JP | 2013-064777 A | 4/2013 |
| WO | 2010/025440 A2 | 3/2010 |
| WO | 2013/049237 A1 | 4/2013 |

* cited by examiner

SPEECH RECOGNITION USING ELECTRONIC DEVICE AND SERVER

CROSS-REFERENCE TO RELATED APPLICATION(S)

This application is a continuation application of prior application Ser. No. 14/680,444, filed on Apr. 7, 2015, which issues as U.S. Pat. No. 9,640,183 on May 2, 2017 and claimed the benefit under 35 U.S.C. § 119(e) of a U.S. Provisional application filed on Apr. 7, 2014 in the U.S. Patent and Trademark Office and assigned Ser. No. 61/976,142, and under 35 U.S.C. § 119(a) of a Korean patent application filed on Mar. 20, 2015 in the Korean Intellectual Property Office and assigned Serial Number 10-2015-0038857, the entire disclosure of each of which is hereby incorporated by reference.

TECHNICAL FIELD

The present disclosure relates to a technology for executing speech instructions to speech inputs of users by using a speech recognition model, which is equipped in an electronic device, and a speech recognition model available in a server.

BACKGROUND

In addition to traditional input methods of using a keyboard or a mouse, recent electronic devices may support input operations using speech. For example, electronic devices such as smart phones or tablet computers may perform an operation of analyzing a user's speech that is input during a specific function (e.g., S-Voice or Siri), converting the speech into text, or executing a function corresponding to the speech. Some electronic devices may normally remain in an always-on state for speech recognition such that they may awake or be unlocked upon detection of speech, and perform functions of Internet surfing, telephone conversations, SMS/e-mail readings, etc.

Although many technologies have been proposed for speech recognition, it is inevitable to encounter limitations to speech recognition in electronic devices. For example, electronic devices may use speech recognition models, which are embedded therein, for quick response to speech recognition. However, the capacities of electronic devices are limited which may cause a restriction in the number or kinds of recognizable speech inputs.

To obtain more accurate and reliable results for speech recognition, electronic devices may transmit speech inputs to a server to request the server to recognize the speech inputs, provide results which are fed back from the server, or perform specific operations with reference to the fed-back results. However, that manner could increase an amount of communication traffic through the electronic devices and cause relatively slow response rates.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a speech recognition method capable of utilizing two or more different speech recognition capabilities or models to diminish inefficiency that may be encountered during the aforementioned diverse situations.

In accordance with an aspect of the present disclosure, an electronic device is provided. The electronic device includes a processor configured to perform an automatic speech recognition (ASR) on a speech input by using a speech recognition model that is stored in a memory, and a communication module configured to provide the speech input to a server and receive a speech instruction, which corresponds to the speech input, from the server. The processor may further perform an operation corresponding to a result of the ASR if a confidence score of the ASR result is higher than a first threshold, and provide a feedback if a confidence score of the ASR result is lower than a second threshold.

In accordance with another aspect of the present disclosure, a method of executing speech recognition in an electronic device is provided. The method includes obtaining a speech input from a user, generating a speech signal corresponding to the obtained speech, performing first speech recognition on at least a part of the speech signal, acquiring first operation information and a first confidence score, transmitting at least a part of the speech signal to a server for second speech recognition, receiving second operation information, which corresponds to the transmitted signal, from the server, performing a function corresponding to the first operation information if the first confidence score is higher than a first threshold value, providing a feedback if the first confidence score is lower than a second threshold value, and performing a function corresponding to the second operation information if the first confidence score is between the first threshold value and second threshold value.

In accordance with an aspect of the present disclosure, it may be advantageous to increase a response rate and accuracy by executing speech recognition by using a speech recognition model, which is prepared for an electronic device in itself, and using a result of speech recognition supplementary from a server which refers to a result of the speech recognition by the speech recognition model.

Additionally, it may be permissible to compare results of speech recognition between an electronic device and a server, and reflect a result of the comparison to a speech recognition model or algorithm. Then, it may be possible to continuously improve accuracy and response rate to permit repetitive speech recognition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
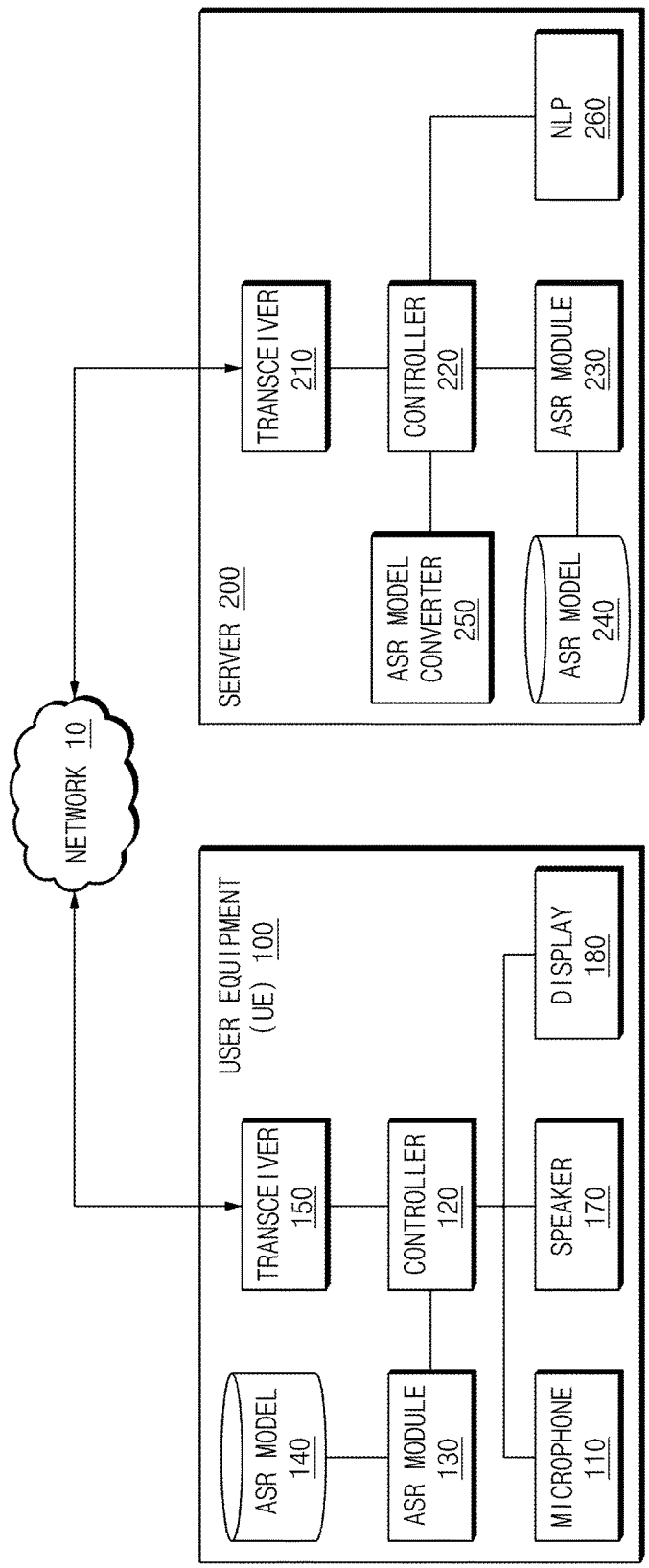
FIG. 1 is a block diagram illustrating an electronic device and a server, which is connected to the electronic device through a network, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include/comprise," or "may include/comprise" indicate the existence of a corresponding feature (e.g., numerical values, functions, operations, or components/elements) but do not exclude the existence of other features.

As used herein, the terms "A or B," "at least one of A or/and B," or "one or more of A or/and B" may include all allowable combinations. For instance, the terms "at least one of A and B" or "at least one of A or B" may indicate (1) to include at least one A, (2) to include at least one B, or (3) to include both at least one A and at least one B.

As used herein, the terms such as "1st," "2nd," "first," "second," and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other For example, a first component may be referred to as a second component and vice versa without departing from the scope of the present disclosure.

As used herein, when one element (e.g., a first element) is referred to as being "operatively or communicatively connected with/to" or "connected with/to" another element (e.g., a second element), it should be understood that the former may be directly coupled with the latter, or connected with the latter via an intervening element (e.g., a third element). But, it will be understood that when one element is referred to as being "directly coupled" or "directly connected" with another element, it means that there any intervening element is not existed between them.

In the description or claims, the term "configured to" (or "set to") may be changeable with other implicative meanings such as "suitable for," "having the capacity of," "designed to," "adapted to," "made to," or "capable of," and may not simply indicate "specifically designed to." Alternatively, in some circumstances, a term such as "a device configured to" may indicate that the device "may do" something together with other devices or components. For instance, the term "a processor configured to (or set to) perform A, B, and C" may indicate a generic-purpose processor (e.g., CPU or application processor) capable of performing its relevant operations by executing one or more software or programs stored in an exclusive processor (e.g., embedded processor), which is prepared for the operations, or in a memory.

The terms in this specification are used to describe embodiments of the present disclosure and are not intended to limit the scope of the present disclosure. The terms of a singular form may include plural forms unless otherwise specified. Unless otherwise defined, all the terms used herein, which include technical or scientific terms, may have the same meaning that is generally understood by a person skilled in the art. It will be further understood that terms, which are defined in a dictionary and commonly used, should also be interpreted as is customary in the relevantly related art and not in an idealized or overly formal sense unless expressly so defined herein in various embodiments of the present disclosure. In some cases, terms even defined in the specification may not be understood as excluding embodiments of the present disclosure.

Hereinafter, an electronic device according to various embodiments of the present disclosure will be described in more detail with reference to the accompanied drawings. In the following description, the term "user" in various embodiments may refer to a person using an electronic device or a device using an electronic device (for example, an artificial intelligent electronic device).

FIG. 1 is a block diagram illustrating an electronic device and a server, which is connected with the electronic device through a network, according to an embodiment of the present disclosure.

Referring to FIG. 1, the electronic device may include a configuration such as a user equipment (UE) 100. For example, the UE 100 may include a microphone (microphone) 110, a controller 120, an Automatic Speech Recognition (ASR) module 130, an ASR model 140, a transceiver 150, a speaker 170, and a display 180. The configuration of the UE 100 shown in FIG. 1 is provided as an example. Thus, it may be modified by way of various alternative embodiments of the present disclosure. For instance, the electronic device may include a configuration such as a UE 101 shown in FIG. 2, an electronic device 701 shown in FIG. 7, or an electronic device 800 shown in FIG. 8, or may be properly modified with those configurations. Hereinafter, various embodiments of the present disclosure will be described with reference to the UE 100.

The UE 100 may obtain a speech input through the microphone 110 from a user. For instance, if a user executes an application which is relevant to speech recognition, or if an operation of speech recognition is in activation, the user's speech may be obtained by the microphone 110. The microphone 110 may include an analog-digital converter (ADC) to convert an analog signal into a digital signal. In some embodiments, an ADC, a digital-analog converter (DAC), a circuit processing diverse signals, or a pre-processing circuit may be included in the controller 120.

The controller 120 may provide a speech input, which is obtained by the microphone 110, and an audio signal (or speech signal), which is generated from a speech input, to the ASR module 130 and the transceiver 150. An audio signal provided to the ASR module 130 by the controller 120 may be a signal which is pre-processed for speech recognition. For instance, an audio signal may be a signal which is noise-filtered or processed to be pertinent to human voice by an equalizer. Otherwise, a signal provided to the transceiver 150 by the controller 120 may be a speech input itself. Different from the ASR module 130, the controller 120 may transmit original speech data to the transceiver 150 to control a server 200 to work with a pertinent or more functional audio signal processing operation.

The controller 120 may control general operations of the UE 100. For instance, the controller 120 may control an operation for a speech input from a user, an operation of speech recognition, and execution of functions according to speech recognition.

The ASR module 130 may perform speech recognition on an audio signal which is provided from the controller 120. The ASR module 130 may perform functions of isolated word recognition, connected word recognition, and large vocabulary recognition. The ASR performed by the ASR module 130 may be implemented in a speaker-independent or speaker-dependent type. The ASR module 130 may not be limited to a single speech recognition engine, and may be formed of two or more speech recognition engines. Additionally, if the ASR module 130 includes a plurality of speech recognition engines, each speech recognition engine may be different one another in direction of recognition. For instance, one speech recognition engine may recognize wakeup speech, e.g., "Hi. Galaxy," for activating an ASR function, while the other speech recognition engine may recognize command speech, e.g., "Read a recent e-mail." The ASR module 130 may perform speech recognition with reference to the ASR model 140. Therefore, it may be permissible to determine a range (e.g., kind or number) of speech input which is recognizable by the ASR model 140. The aforementioned description about the ASR module 130 may be applicable even to an ASR module 230 belonging to the server 200 which will be described later.

The ASR module 130 may convert a speech input into a text. The ASR module 130 may determine an operation or function which is to be performed by the electronic device in response to a speech input. Additionally, the ASR module 130 may determine a confidence score or score of a result of ASR.

The ASR model 140 may include grammar. Here, grammar may include various types of grammar, which is statistically generated through a user's input or on the World Wide Web in addition to linguistic grammar. In various embodiments of the present disclosure, the ASR model 140 may include an acoustic model, and a language model. Otherwise, the ASR model 140 may be a speech recognition model which is used for isolated word recognition. In various embodiments of the present disclosure, the ASR model 140 may include a recognition model for performing speech recognition in a pertinent level in consideration of arithmetic and storage capacities of the UE 100. For instance, the grammar may, regardless of linguistic grammar, include grammar for a designated instruction structure. For example, "call [user name]" corresponds to grammar for sending a call to a user of [user name], and may be included in the ASR model 140.

The transceiver 150 may transmit a speech signal, which is provided from the controller 120, to the server 200 by way of a network 10. Additionally, the transceiver 150 may receive a result of speech recognition, which corresponds to the transmitted speech signal, from the server 200.

The speaker 170 and the display 110 may be used for interacting with a user's input. For instance, if a speech input is provided from a user through the microphone 110, a result of speech recognition may be expressed in the display 180 and output through the speaker 170. Needless to say, the speaker 170 and the display 180 may also perform general functions of outputting sound and a screen in the UE 100.

The server 200 may include a configuration for performing speech recognition with a speech input which is provided from the UE 100 by way of the network 20. Then, partial elements of the server 200 may correspond to the UE 100. For instance, the server 200 may include a transceiver 210, a controller 220, the ASR module 230, and an ASR model 240. Additionally, the server 200 may further include an ASR model converter 250, or a natural language processing (NLP) unit 260.

The controller 220 may control functional modules for performing speech recognition in the server 200. For instance, the controller 220 may be coupled with the ASR module 230 and/or the NLP 260. Additionally, the controller 220 may cooperate with the UE 100 to perform a function relevant to recognition model update. Additionally, the controller 220 may perform a pre-processing operation with a speech signal, which is transmitted by way of the network 10, and provide a pre-processed speech signal to the ASR module 230. This pre-processing operation may be different from the pre-processing operation, which is performed in the UE 100, in type or effect. In some embodiments, the controller 220 of the server 200 may be referred to as an orchestrator.

The ASR module 230 may perform speech recognition with a speech signal which is provided from the controller 220. The above description regarding the ASR module 130 may be at least partially applied to the ASR module 230. While the ASR module 230 for the server 200 and the ASR module 130 for the UE 100 are described as performing partially similar functions, they may be different each other in functional boundary or algorithm. The ASR module 230 may perform speech recognition with reference to the ASR model 130, and then generate a result that is different from a speech recognition result of the ASR module 130 of the UE 100. In more detail, the server 200 may generate a recognition result through the ASR module 230 and the NLP 260 by means of speech recognition, natural language understanding (NLU), Dialog Management (DM), or a combination thereof, while the UE 100 may generate a recognition result through the ASR module 130. For instance, first operation information and a first confidence score may be determined after an ASR operation of the ASR module 130, and second operation information and a second confidence score may be determined after an ASR operation of the ASR module 230. In some embodiments, results from the ASR modules 130 and 230 may be identical to each other, or may be different in at least one part. For instance, the first operation information corresponds to the second operation information, but the first confidence score may be higher than the second confidence score. In various embodiments of the present disclosure, an ASR operation performed by the ASR module 130 of the UE 100 may be referred to as "first speech recognition" while an ASR operation performed by the ASR module 230 of the server 200 may be referred to as "second speech recognition."

In various embodiments of the present disclosure, if the first speech recognition performed by the ASR module 130 is different from the second speech recognition performed by the ASR module 230 in algorithm or in usage model, the ASR model converter 250 may be included in the server 200 to change a model type between them.

Additionally, the server 200 may include the NLP 260 for sensing a user's intention and determining a function, which is to be performed, with reference to a recognition result of the ASR module 230. The NLP 260 may perform natural word understanding, which mechanically analyzes an effect of words spoken by humans and then makes the words into computer-recognizable words, or reversely, a natural word processing that expresses human-understandable words from the computer-recognizable words.

Figure 2:
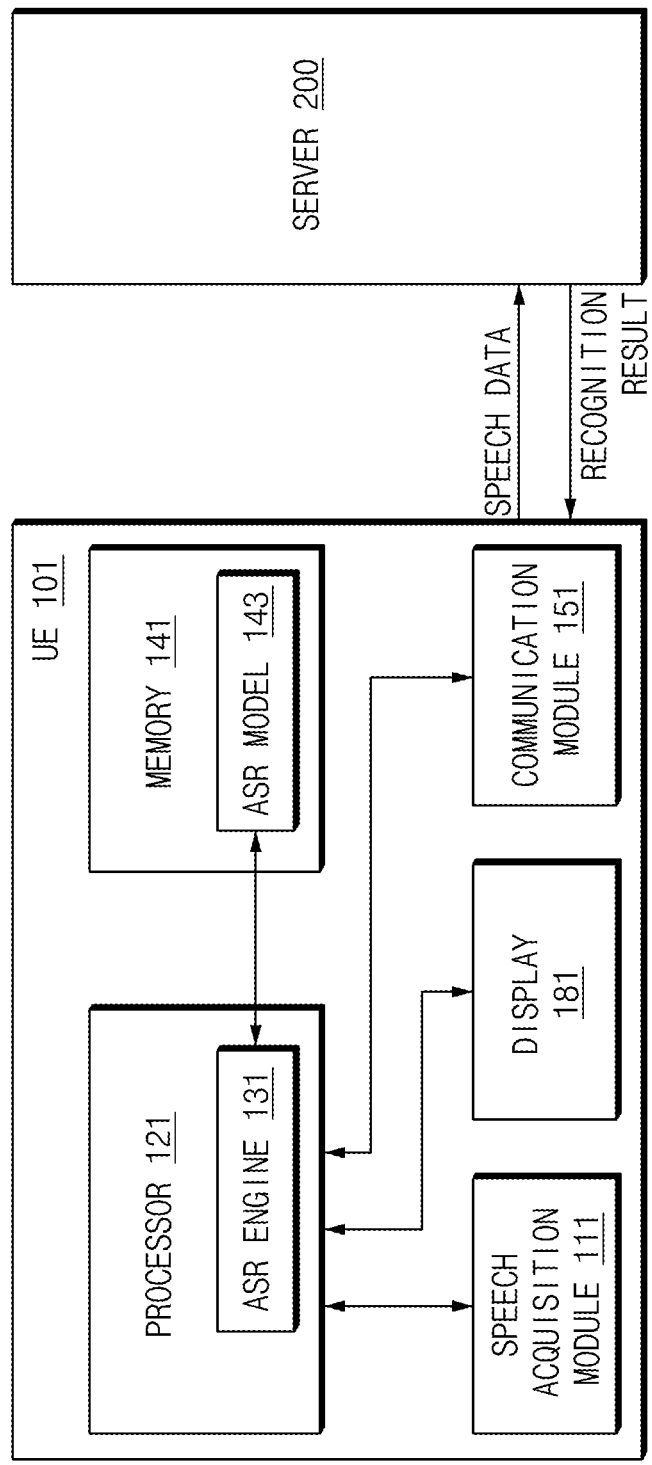
FIG. 2 is a block diagram illustrating an electronic device and a server according to embodiment of the present disclosure.

FIG. 2 is a block diagram illustrating an electronic device and a server according to embodiment of the present disclosure.

Referring to FIG. 2, an electronic device is exemplified in a configuration different from that of FIG. 1. However, a speech recognition method disclosed in this specification may also be performed by an electronic device/user equipment shown in FIG. 1, FIG. 2, FIG. 7, or FIG. 8, some of which will be described below, by another device which can be modifiable or variable from the electronic device/user equipment.

Referring to FIG. 2, a UE 101 may include a processor 121 and a memory 141. The processor 121 may include an ASR engine 131 for performing speech recognition. The memory 141 may store an ASR model 143 which is used by the ASR engine 131 to perform speech recognition. For instance, considering functions performed by elements of the configuration, it can be seen that the processor 121, the ASR engine 131, and the ASR model (or the memory 141) of FIG. 2 may correspond respectively with the controller 120, the ASR model 130, and the ASR model 140 of FIG. 1. Thus, a duplicative description will not be further offered hereinafter.

The UE 101 may obtain a speech input from a user by using a speech recognition (i.e., acquisition) module 111 (e.g., the microphone 110). The processor 121 may perform an ASR operation to the obtained speech input by means of the ASR model 143 which is stored in the memory 141. Additionally, the UE 101 may provide a speech input to the server 200 by way of a communication module 151, and receive a speech instruction (e.g., a second operation information), which corresponds to an speech input, from the server 200. The UE 101 may output a speech recognition result, which is acquisitive by the ASR engine 131 and the server 200, through a display 181 (or speaker).

Hereinafter, diverse speech recognition methods will be described on a UE 100 in conjunction with FIGS. 3 to 6.

Figure 3:
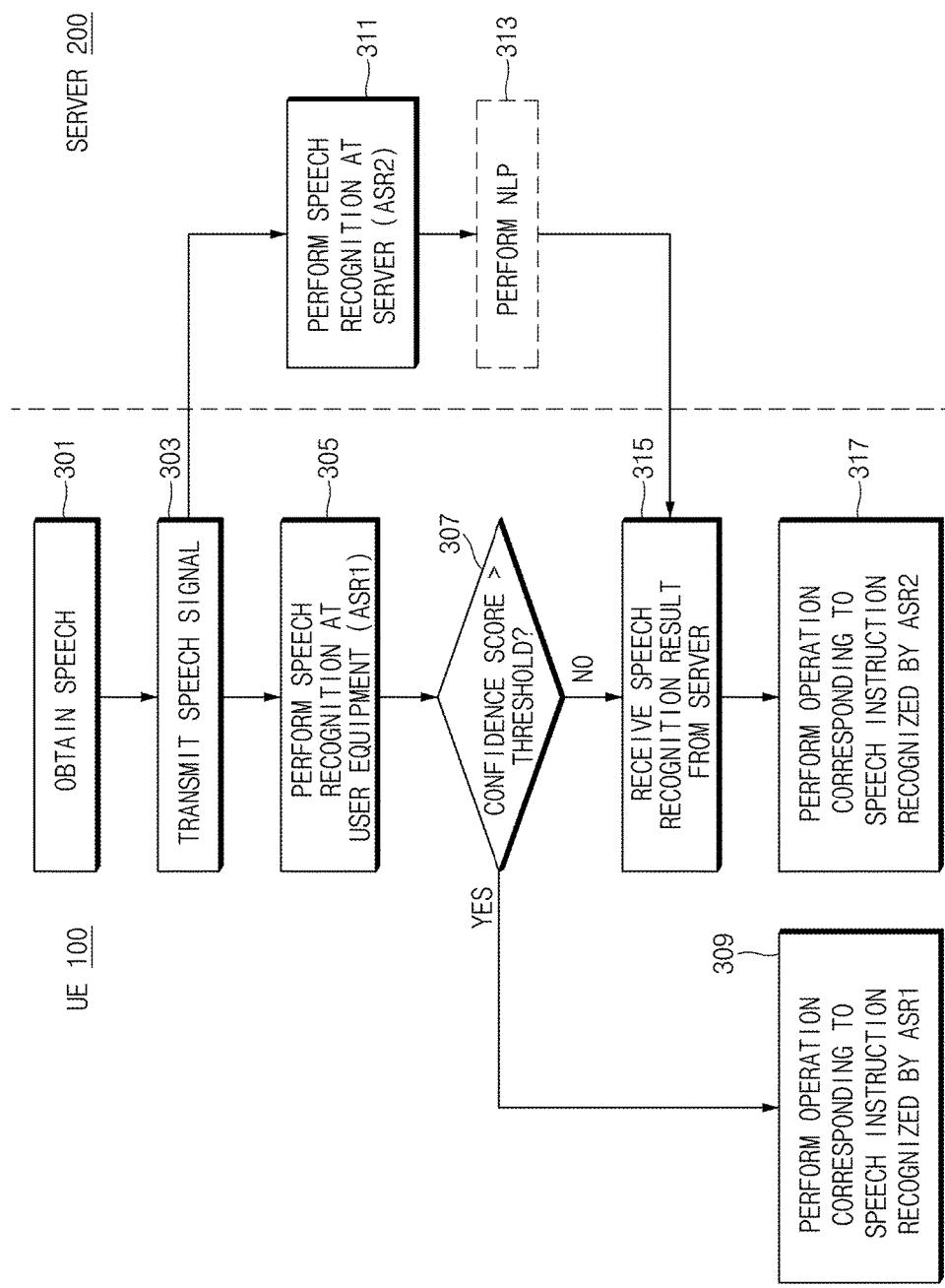
FIG. 3 is a flowchart showing a speech recognition method according to an embodiment of the present disclosure.

FIG. 3 is a flowchart showing a speech recognition method according to an embodiment of the present disclosure.

Referring to FIG. 3, the UE 100 may obtain a user's speech input by using a speech acquisition module such as microphone in operation 301. This operation may be performed in the state that the user executes a specific function or application which is relevant to speech recognition. But in some embodiments, speech recognition of the UE 100 may be conditioned in an always-on state (e.g., the microphone is normally turned on), for which operation 301 may be normally active to a user's speech. Otherwise, an ASR operation may be conditioned to be an active state by different speech recognition engines in response to a specific speech input (e.g., "Hi, Galaxy"), as aforementioned, and then performed with subsequently input speech recognition information.

In operation 303, the UE 100 may transmit a speech signal (or at least a part of a speech signal) to the server 200. In an internal view for the device, a speech signal (e.g., an audio signal made by a speech input is converted into a (digital) speech signal and by pre-processing the speech signal) may be provided to the ASR module 130 by a processor (e.g., the controller 120). In other words, in operation 303, the UE 100 may provide a speech signal, which is regarded as a target of recognition, to an ASR module which is placed in and out of a device capable of performing speech recognition. The UE 100 may utilize all of speech recognition capabilities that are prepared in itself and the server 200.

In operation 305, the UE 100 may perform speech recognition by itself. This speech recognition may be referred to as "ASR1." For instance, the ASR module 130 may perform speech recognition with a speech input by using the ASR model 140. For instance, the ASR model 140 may perform ASR1 with at least a part of a speech signal. After performing ASR1, a result of speech recognition may be obtained. For instance, if a user provides a speech input such as "tomorrow weather," the UE 100 may determine operation information such as "weather application, tomorrow weather output" by using a function of speech recognition to the speech input. Additionally, a result of speech recognition may include a confidence score of operation information. For instance, although the ASR module 130 may determine a confidence score of 95% if a user's speech is analyzed as clearly indicating "tomorrow weather," the ASR module 130 may also give a confidence score of 60% to a determined operation information even if a user's speech is analyzed as being vague to indicate "everyday weather" or "tomorrow weather."

In operation 307, a processor may determine whether a confidence score is higher than a threshold. For instance, if a confidence score of operation information determined by the ASR module 130 is higher than a predetermined level (e.g., 80%), the UE 100 may perform ASR1, i.e. an operation corresponding to a speech instruction recognized by a speech recognition function of the UE 100 in itself, in operation 309. This operation may be performed with at least one function that is practicable by the processor, at least one application, or at least one of inputs based on an execution result of ASR operation.

Operation 309 may be performed before a speech recognition result is received from the server 200 (e.g., before operation 315). In other words, if speech recognition self-performed by the UE 100 results in a sufficient confidence score to recognize a speech instruction, the UE 100 may directly perform a corresponding operation, without waiting for an additional result of speech recognition which is received from the server 200, to provide a quick response time to a user's speech input.

If a confidence score is less than the threshold in operation 307, the UE 100 may be maintained in a standby state until a speech recognition result is received from the server 200. During the standby state, the UE 100 may display a suitable message, icon, or image to inform a user that speech recognition is operating to the speech input.

In operation 311, speech recognition by the server 200 may be performed with a speech signal which is transmitted to the server 200 in operation 303. This speech recognition may be referred to as "ASR2." Additionally, an NLP may be performed in operation 313. For instance, an NLP may be performed with a speech input or a recognition result of ASR2 by using the NLP 260. In some embodiments, this operation may be performed by selection of the user.

In operation 315, if speech recognition results (e.g., a second operation information and a second confidence score) of ASR1, ASR2, or NLP are received from the server 200, operation 317 may include an operation corresponding to a speech instruction (e.g., second operation information) by way of ASR2. Since operation 317 needs to allow an additional time for transmitting a speech signal at operation 303 and acquiring a speech recognition result at operation 315, it takes a longer time than operation 309. However, it may be possible to perform a speech recognition operation with higher confidence score and accuracy even in comparison with a case of speech recognition that operation 317 is incapable of self-processing or capable of self-processing but resulting in a low confidence score.

Figure 4:
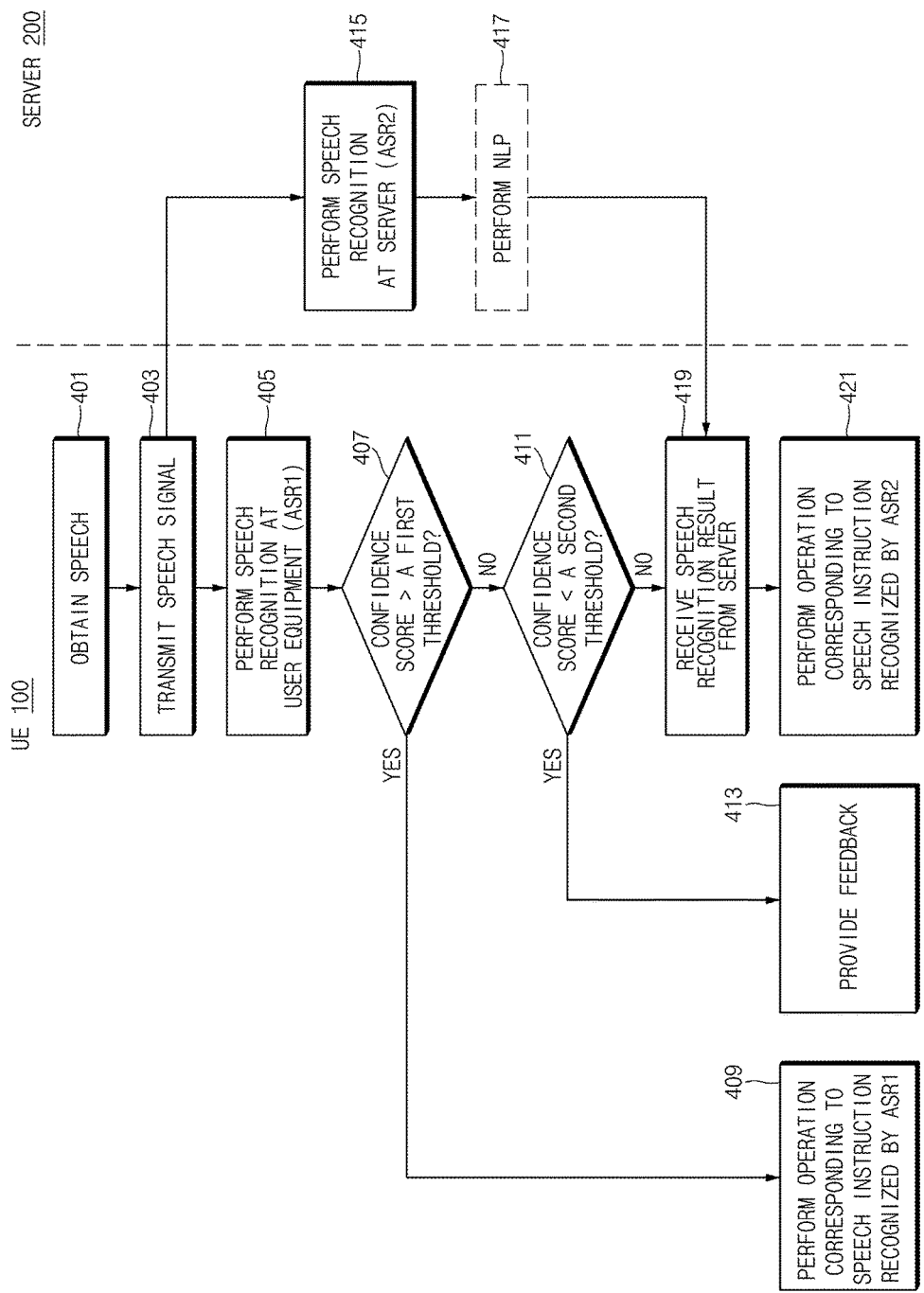
FIG. 4 is a flowchart showing a speech recognition method according to embodiment of the present disclosure.

FIG. 4 is a flowchart showing a speech recognition method according to an embodiment of the present disclosure.

Referring to FIG. 4, as speech recognition operation 401, speech signal transmit operation 403, ASR1 operation 405, ASR2 operation 415, and NLP operation 417 correspond respectively to the aforementioned operations 301, 303, 305, 311, and 313, those operations will not be further described below.

A speech recognition method described in conjunction with FIG. 4 may be performed by referring to two thresholds. Based on a first threshold and a second threshold that is lower than the first threshold in confidence score, different operations (e.g., operations 409, 413, and 421, respectively) may be performed respectively for the cases that a confidence score of ASR1 result from operation 405 is: (1) higher than the second threshold; (2) lower than the second threshold; and (3) between the first and second thresholds.

If a confidence score is determined as being higher than the first threshold in operation 407, the UE 100 may perform an operation corresponding to an ASR1 result in operation 409. If a confidence score is determined as being lower than the first threshold in operation 407, the process may go to determine whether the confidence score is lower than the second threshold in operation 411.

In operation 411, if a confidence score is lower than the second threshold, the UE 100 may provide a feedback for the confidence score. This feedback may include a message or an audio output which indicates that a user's speech input was abnormally recognized, or normally recognized but in lack of confidence. For instance, the UE 100 may display or output a guide message, such as "Your speech is not recognized, Please speak again," through a screen or a speaker. Otherwise, the UE 100 may confirm accuracy of a low-confident recognition result by guiding a user to a relatively easy-recognizable speech input (e.g., "Yes," "Not," "No," "Impossible," "Never," and so on) by way of a feedback such as "Did you speak XXX?"

Once a feedback is provided in operation 413, operation 421 may not be performed even if a speech recognition result is obtained in operation 409 along a lapse of time later. This is because a feedback may cause a new speech input from a user and then it may be unreasonable to perform an operation with the previous speech input. But in some embodiments, operation 421 may be performed after operation 413 if there is no additional input from a user for a predetermined time, despite a feedback of operation 413, and if a speech recognition result (e.g., a second operation information and a second confidence score), which is received from the server 200 in operation 419, satisfies a predetermined condition (e.g., the second confidence score is higher than the first threshold or a certain third threshold).

In operation 411, if a confidence score obtained from operation 405 is higher than the second threshold (i.e. the confidence score ranks between the first and second thresholds), the UE 100 may receive a speech recognition result from the server 200 in operation 419. In operation 421, the UE 100 may perform an operation which corresponds to a speech instruction (second operation information) by way of ASR2.

In the embodiment shown in FIG. 4, it may be permissible to differentiate a confidence score, which results from speech recognition by the UE 100, into a usable level with reference to usable and unusable levels and an ASR result of the server 200, and then enable an operation that is pertinent to the differentiated confidence score. Especially, if a confidence score is excessively low, the UE 100 may provide a feedback, regardless of reception of a result from the server 200, to guide a user to a speech re-input, and may thereby prevent a message, such as "not recognized," from being provided to a user after a long time from a response standby time.

Figure 5:
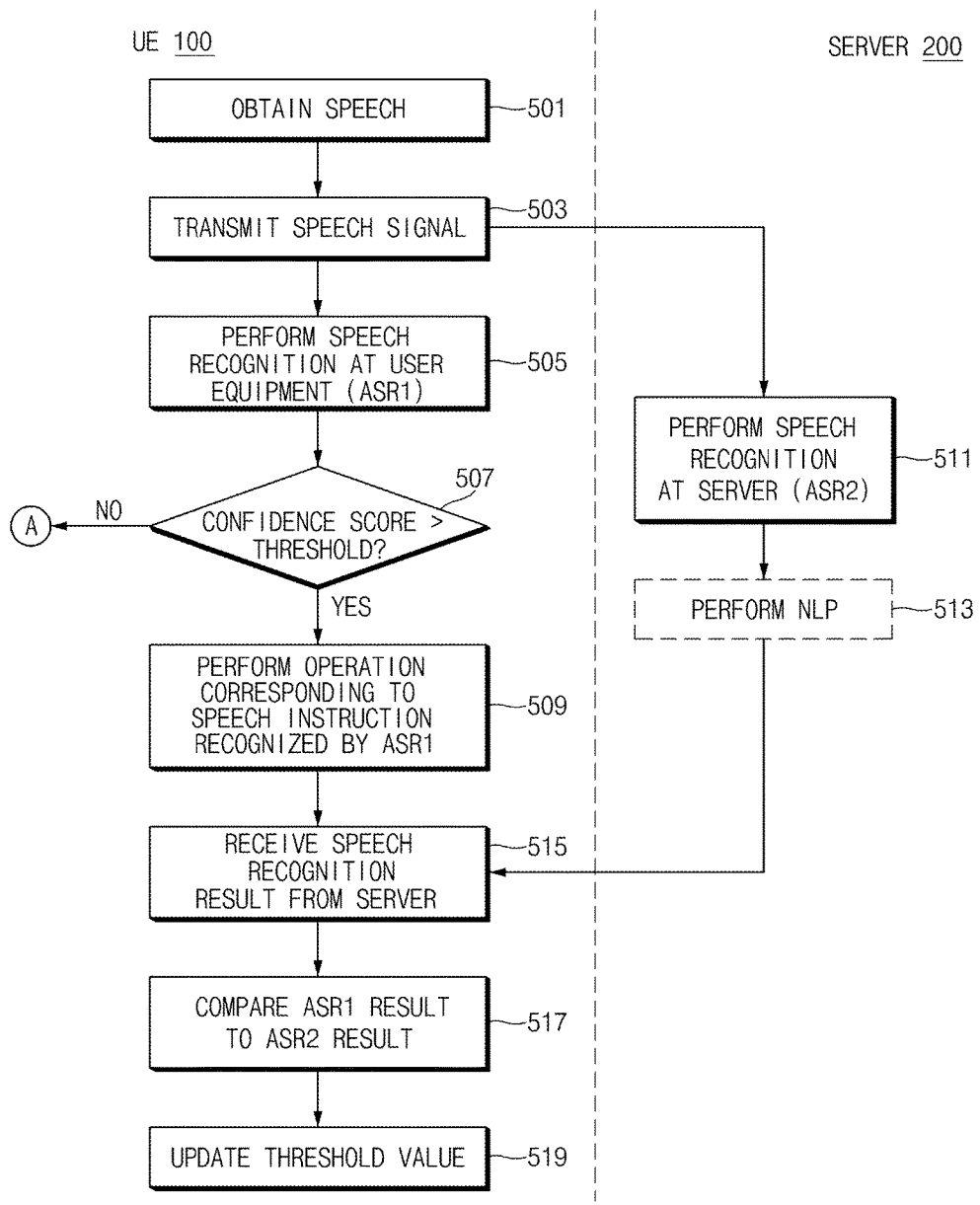
FIG. 5 is a flowchart showing a method of updating a threshold according to an embodiment of the present disclosure.

FIG. 5 is a flowchart showing a method of updating a threshold according to an embodiment of the present disclosure.

Referring to FIG. 5, as speech acquisition operation 501, speech signal transmit operation 503, ASR1 operation 505, ASR2 operation 511, and NLP operation 513 correspond respectively to the aforementioned operations 301, 303, 305, 311, and 313, those operations will not be further described below.

If a confidence score of a result from ASR1 is determined to be larger than a threshold (e.g., a first threshold) in operation 507, the process may go to operation 509 to perform an operation corresponding to a speech instruction (e.g., first operation information) by way of ASR1. If a confidence score of an ASR1 result is determined as being lower than the threshold, an operation subsequent to operation 315 of FIG. 3 or operation 411 of FIG. 4 may be performed.

In the embodiment of FIG. 5, even after operation 509, the process may not be terminated but may continue to perform operations 515 through 517. In operation 515, the UE 100 may receive a speech recognition result from the server 200. For instance, the UE 100 may obtain second operation information and a second confidence score, which result from ASR2, to a speech signal transmitted during operation 503.

In operation 517, the UE 100 may compare ASR1 with ASR2 in recognition result. For instance, the UE 100 may determine whether recognition results from ASR1 and ASR2 are identical to or different from each other. For instance, if ASR1 recognizes speech as "Tomorrow weather" and ASR2 recognizes speech as "Tomorrow weather?," both may include operation information such as "Output weather application, Output tomorrow weather." In this case, it can be understood that such recognition results of ASR1 and ASR2 may correspond each other. Otherwise, if different operations are performed after speech recognition, the two (or more) speech recognition results may be determined as none-corresponding each other.

In operation 519, the UE 100 may change a threshold by comparing a result of ASR1 (self-operation of speech recognition in the UE 100) with a speech instruction which is received from the server 200. For instance, the UE 100 may decrease the first threshold if the first operation information and the second operation information are identical each other or include a speech instruction corresponding thereto. For instance, for a certain speech input, a general method is designed to control a speech recognition result by itself from the UE 100 not to be adopted, without waiting for a response from the server 200, until a confidence score reaches 80%, whereas this method may be designed to control a confidence score higher even than 70% to enable a speech recognition result by itself from the UE 100 to be adopted by way of threshold update. Threshold update may be resumed whenever a user plays the speech recognition function and thus it may shorten a response time because speech recognition frequently operating by a user is set to have a lower threshold.

In the meantime, if ASR1 is different from ASR2 in result, the threshold may increase. In some embodiments, an operating of updating a threshold may occur after a predetermined condition is accumulated as many as the predetermined number of times. For instance, for a certain speech input, if results from ASR1 and ASR2 agree with each other in more than five times, a threshold may be updated lower.

Figure 6:
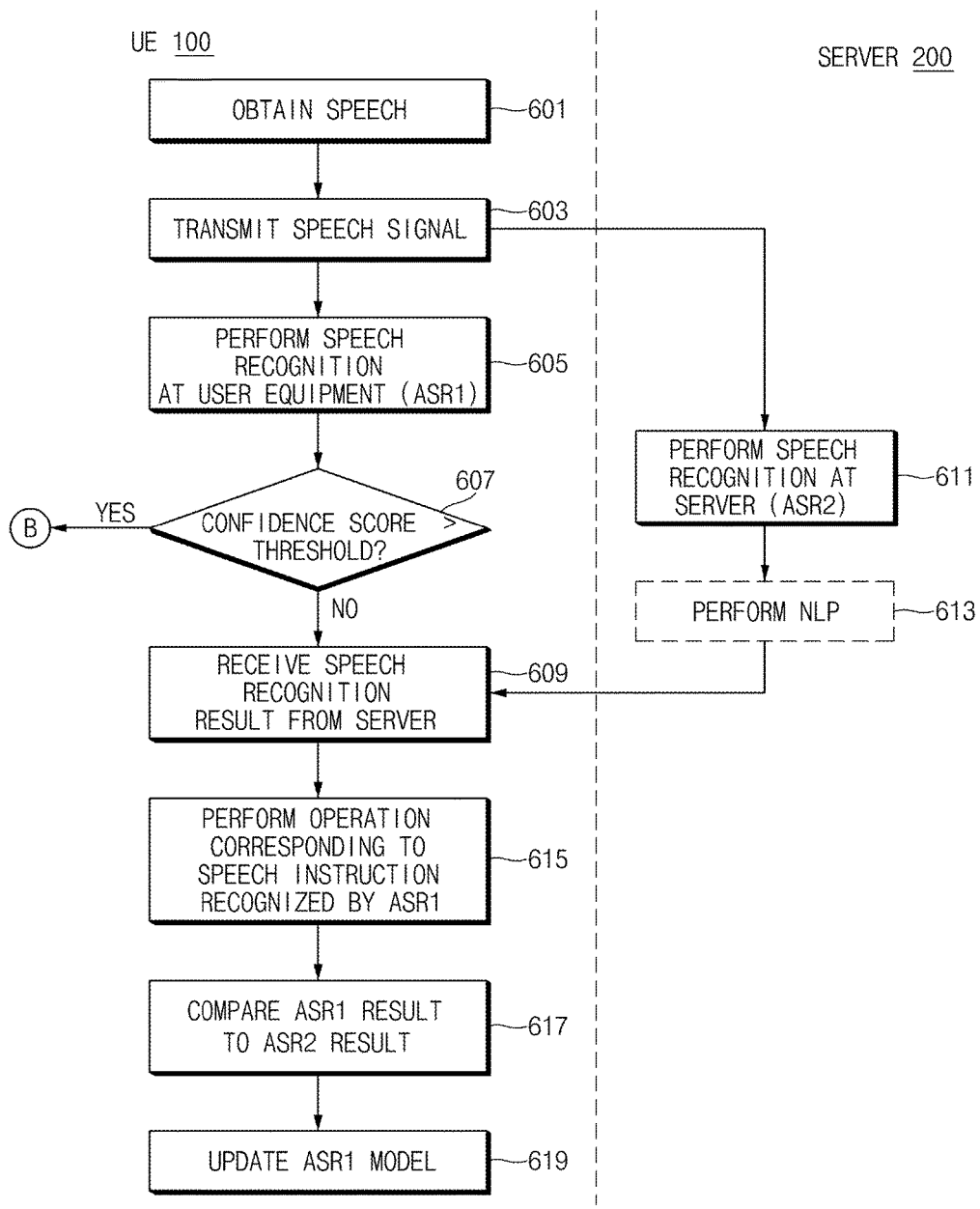
FIG. 6 is a flowchart showing a method of updating a speech recognition model according to an embodiment of the present disclosure.

FIG. 6 is a flowchart showing a method of updating a speech recognition model according to an embodiment of the present disclosure.

Referring to FIG. 6, as speech recognition operation 601, speech signal transmit operation 603, ASR1 operation 605, ASR2 operation 611, and NLP operation 613 correspond respectively to the aforementioned operations 301, 303, 305, 311, and 313, those operations will not be further described below.

In operation 607, if a confidence score of a result of ASR1 is determined as being greater than a threshold (e.g., a first threshold), an operation subsequent to operation 309 of FIG. 3, operation 409 of FIG. 4, and operation 509 of FIG. 5 may be performed.

If a confidence score of a result of ASR1 is determined as being lower than the threshold in operation 607, the UE 100 may receive a speech recognition result from the server 200 in operation 609 and in operation 615, perform an operation corresponding to a speech instruction by way of ASR2. Operations 609 and 615 may correspond to operations 315 and 317 of FIG. 3, or operations 419 and 421 of FIG. 4.

In operation 617, the UE 100 may compare ASR1 with ASR2 in speech recognition result. Operation 617 may correspond to operation 517 of FIG. 5.

In operation 619, the UE 100 may update its own speech recognition model (e.g., the ASR model 140) with reference to a comparison result from operation 617. For instance, the UE 100 may add a speech recognition result (e.g., second operation information, or the second operation information and a second confidence score) of ASR2, which is generated in response to a speech input, to the speech recognition model. For instance, if the first operation information does not correspond to the second operation information, the UE 100 may add the second operation information (and the second confidence score) to a speech recognition model, which is used for the first speech recognition, with reference to the first and second confidence scores (e.g., if the second confidence score is higher than the first confidence score). Similar to the embodiment shown in FIG. 5, an operation of updating a speech recognition model may occur after a predetermined condition is accumulated a predetermined number of times.

Figure 7:
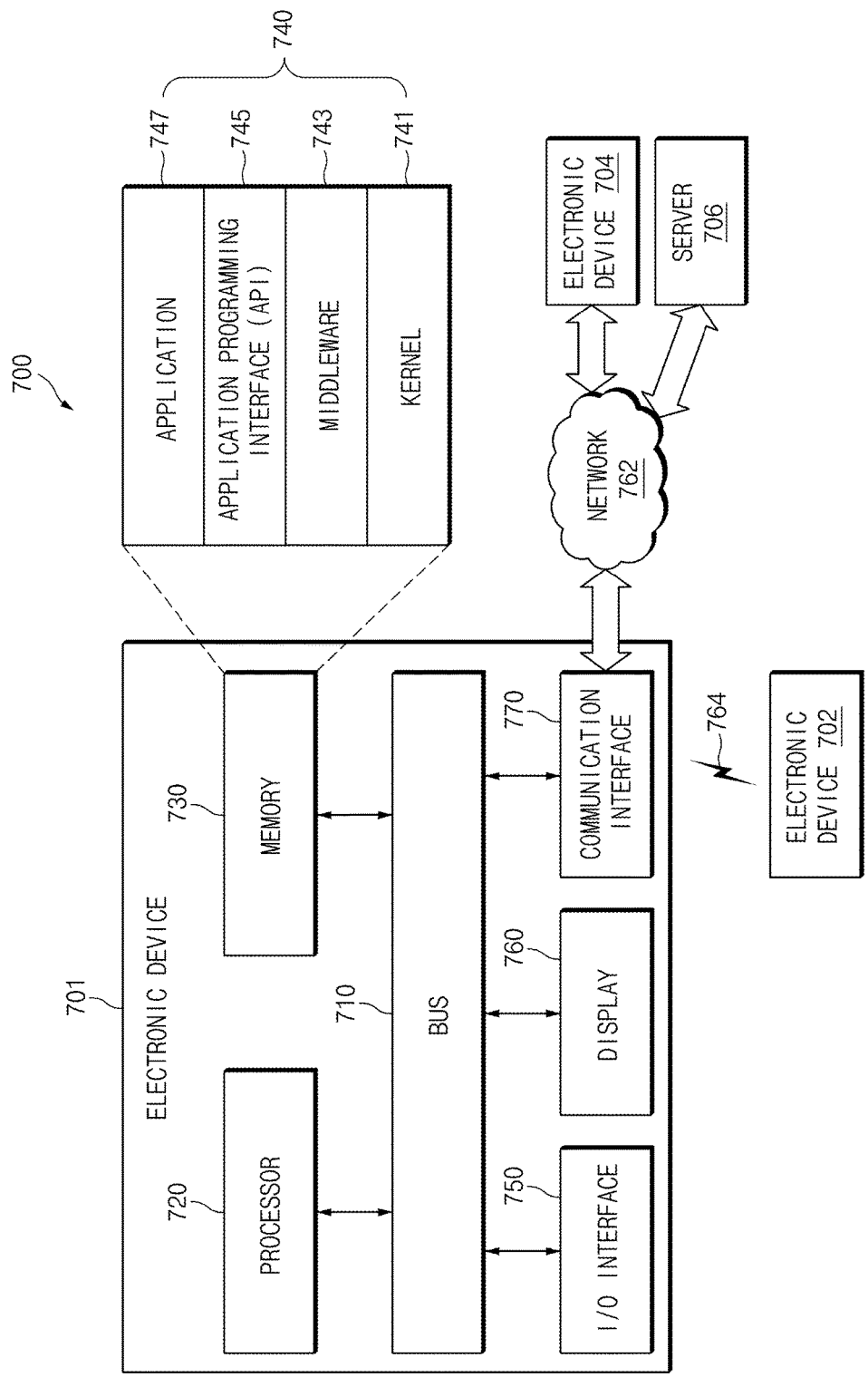
FIG. 7 is a block diagram illustrating an electronic device in a network environment according to an embodiment of the present disclosure.

FIG. 7 is a block diagram illustrating an electronic device in a network environment according to an embodiment of the present disclosure.

Referring to FIG. 7, an electronic device 710 may be situated in a network environment 700 in accordance with various embodiments. The electronic device 701 may include a bus 710, a processor 720, a memory 730, an input/output (I/O) interface 750, a display 760, and a communication interface 770. In some embodiments, the electronic device 701 may be organized without at least one of the elements, or comprised of another additional element.

The bus 710 may include, for example, a circuit to interconnect the elements 710~770 and help communication (e.g., control messages and/or data) between the elements.

The processor 720 may include one or more of central processing unit (CPU), application processor (AP), or communication processor (CP). The processor 720 may perform for example an arithmetic operation or data processing to control and/or communicate at least one of other elements.

The memory 730 may include a volatile and/or nonvolatile memory. The memory 730 may store for example instructions or data that are involved in at least one of other elements. According to an embodiment, the memory 730 may store a software and/or program 740. The program 740 may include for example a kernel 741, a middleware 743, an application programming interface (API) 745, and/or application programs (or "application") 747. At least one of the kernel 741, the middleware 743, or the API 745 may be called "Operating System (OS)."

The kernel 741 may control or manage, for example, system resources (e.g., the bus 710, the processor 720, or the memory 730) which are used for executing an operation or function implemented embodied in other programs (e.g., the middleware 743, the API 745, or the application programs 747). Additionally, the kernel 741 may provide an interface capable of controlling or managing system resources by approaching individual elements of the electronic device 701 in the middleware 743, the API 745, or the application programs 747.

The middleware 743 may intermediate, for example, to manage the API 745 or the application programs 747 to communicate data with the kernel 741.

Additionally, the middleware 743 may process one or more work requests, which are received from the application programs 747, in priority. For instance, the middleware 743 may allow at least one of the application programs 747 to have priority capable of using a system resource (e.g., the bus 710, the processor 720, or the memory 730) of the electronic device 701. For instance, the middleware 743 may perform scheduling or load balancing to the at least one or more work requests by processing the at least one or more work requests in accordance with the priority allowed for the at least one of the application programs 747.

The API 745, as an interface necessary for the application 747 to control a function that is provided from the kernel 741 or the middleware 743, may be include foe example at least one interface or function (e.g., instruction) for file control, window control, or character control.

The I/O interface 750 may act, for example, as an interface capable of transmitting instructions or data, which are input from a user or another external system, to another element (or other elements) of the electronic device 701. Additionally, the I/O interface 750 may output instructions or data, which are received from another element (or other elements) of the electronic device 701, to a user or another external system.

The display 760 may include, for example, a Liquid Crystal Display (LCD), a light emission diode (LED), an organic light emission Diode (OLED) display, or a micron electro-mechanical system (MEMS) display, or an electronic paper display. The display 760 may express, for example, diverse contents (e.g., text, image, video, icon, or symbol) to a user. The display 760 may include a touch screen and for example, receive an input by touch, gesture, approach, or hovering which is made with a part of a user's body or an electronic pen.

The communication interface 770 may set, for example, communication between the electronic device 710 and an external device (e.g., a first external electronic device 702, a second external electronic device 704, or a server 706). For instance, the communication interface 770 may communicate with the external device (e.g., the second external electronic device 704 or the server 706) in connection with a network 762 through wireless or wired communication.

Wireless communication may adopt at least one of LTE, LTE-A, CDMA, WCDMA, UMTS, WiBro, and GSM for cellular communication protocol. Additionally, wireless may include for example a local area communication 764. The local area communication 764 may include, for example, at least one of Wi-Fi, Bluetooth, near field communication (NFC), or global positioning system (GPS). Wired communication may include, for example, at least one of universal serial bus (USB), high definition multimedia Interface (HDMI), recommended standard 832 (RS-232), and plain old telephone server (POTS). The network 762 may include a communication network, for example, at least one of a computer network (e.g., LAN or WAN), the Internet, and a telephone network.

The first and second external electronic devices 702 and 704 may be same with or different from the electronic device 701. According to an embodiment, the server 706 may include one or more groups of servers. In various embodiments of the present disclosure, all or a part of operations performed in the electronic device 701 may be also performed in another one or a plurality of electronic devices (e.g., the electronic devices 702 and 704, or the server 706). According to an embodiment, if there is a need to perform some function or service by automation or request, the electronic device 701 may request another device (e.g., the electronic device 702 or 704, or the server 706) to perform such function or service, instead of executing the function or service in itself, or request such other devices to perform the function or service to perform in addition to its self-execution. Such another electronic device (e.g., the electronic device 702 or 704, or the server 706) may perform the requested function or service, and then transmit a result thereof to the electronic device 701. The electronic device 701 may process the received result directly or additionally to provide the requested function or service. For this operation, for example, it may be allowable to employ cloud computing, dispersion computing, or client-server computing technology.

Figure 8:
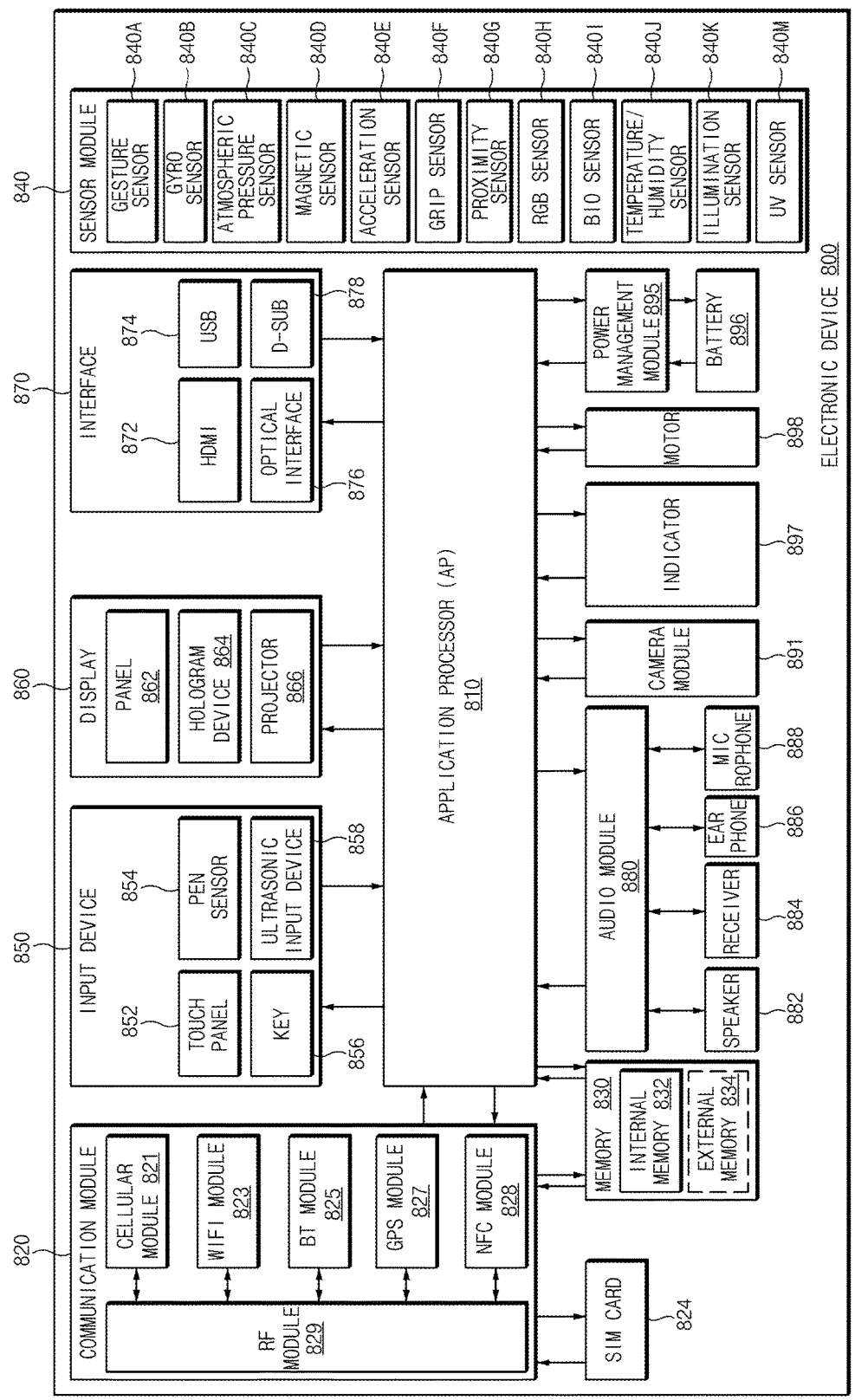
FIG. 8 is a block diagram illustrating an electronic device according to an embodiment of the present disclosure.

FIG. 8 is a block diagram illustrating an electronic device according to an embodiment of the present disclosure.

Referring to FIG. 8, an electronic device 800 may include, for example, all or a part of elements of the electronic device 701 shown in FIG. 7. Referring to FIG. 8, the electronic device 800 may include at least one of one or more Application Processors (AP) 810, a communication module 820, a subscriber identification module (e.g., SIM card) 824, a memory 830, a sensor module 840, an input unit 850, a display 860, an interface 870, an audio module 880, a camera module 891, a power management module 895, a battery 896, an indicator 897, or a motor 898.

The processor (AP) 810 may drive an OS or an application to control a plurality of hardware or software elements connected to the processor 810 and may process and compute a variety of data including multimedia data. The processor 810 may be implemented with a system-on-chip (SoC), for example. According to an embodiment, the AP 810 may further include a graphic processing unit (GPU) and/or an image signal processor. The processor 810 may even include at least a part of the elements shown in FIG. 8. The processor 810 may process instructions or data, which are received from at least one of other elements (e.g., a nonvolatile memory), and then store diverse data into such a nonvolatile memory.

The communication module 820 may have a configuration same with or similar to the communication interface 770 of FIG. 7. The communication module 820 may include a cellular module 821, a WiFi module 823, a Bluetooth (BT) module 825, a GPS module 827, an NFC module 828, and a radio frequency (RF) module 829.

The cellular module 821 may provide voice call, video call, a character service, or an Internet service through a communication network. According to an embodiment, the cellular module 821 may perform discrimination and authentication of an electronic device within a communication network using a subscriber identification module (e.g., a SIM card) 824. According to an embodiment, the cellular module 821 may perform at least a portion of functions that the AP 810 provides. According to an embodiment, the cellular module 821 may include a CP.

Each of the WiFi module 823, the Bluetooth module 825, the GPS module 827, and the NFC module 828 may include a processor for processing data exchanged through a corresponding module, for example. In some embodiments, at least a part (e.g., two or more elements) of the cellular module 821, the WiFi module 823, the Bluetooth module 825, the GPS module 827, and the NFC module 828 may be included within one integrated circuit (IC) or an IC package.

The RF module 829 may transmit and receive, for example, communication signals (e.g., RF signals). The RF module 829 may include a transceiver, a power amplifier module (PAM), a frequency filter, a low noise amplifier (LNA), or an antenna. According to another embodiment, at least one of the cellular module 821, the WiFi module 823, the Bluetooth module 825, the GPS module 827, and the NFC module 828 may transmit and receive an RF signal through a separate RF module.

The SIM card 824 may include, for example, a card, which has a subscriber identification module, and/or an embedded SIM, and include unique identifying information (e.g., Integrated Circuit Card Identifier (ICCID)) or subscriber information (e.g., Integrated Mobile Subscriber Identify (IMSI)).

The memory 830 (e.g., the memory 730) may include, for example, an embedded memory 832 or an external memory 834. For example, the embedded memory 832 may include at least one of a volatile memory (e.g., a dynamic RAM (DRAM), a static RAM (SRAM), a synchronous dynamic RAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.), a hard drive, or solid state drive (SSD).

The external memory 834 may further include a flash drive, for example, a compact flash (CF), a secure digital (SD), a micro-secure Digital (SD), a mini-SD, an extreme Digital (xD), or a memory stick. The external memory 834 may be functionally connected with the electronic device 800 through various interfaces.

The sensor module 840 may measure, for example, a physical quantity, or detect an operation state of the electronic device 800, to convert the measured or detected information to an electric signal. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (e.g., RGB sensor), a living body sensor 840I, a temperature/humidity sensor 840J, an illuminance sensor 840K, or an UV sensor 840M. Additionally or generally, though not shown, the sensor module 840 may further include an E-nose sensor, an electromyography sensor (EMG) sensor, an electroencephalogram (EEG) sensor, an ElectroCardioGram (ECG) sensor, a photoplethysmography (PPG) sensor, an infrared (IR) sensor, an iris sensor, or a fingerprint sensor, for example. The sensor module 840 may further include a control circuit for controlling at least one or more sensors included therein. In some embodiments, the electronic device 800 may further include a processor, which is configured to control the sensor module 840, as a part or additional element, thus enabling to control the sensor module 840 while the processor 810 is in a sleep state.

The input unit 850 may include, for example, a touch panel 852, a (digital) pen sensor 854, a key 856, or an ultrasonic input unit 858. The touch panel 852 may recognize, for example, a touch input using at least one of a capacitive type, a resistive type, an infrared type, or an ultrasonic wave type. Additionally, the touch panel 852 may further include a control circuit. The touch panel 852 may further include a tactile layer to provide a tactile reaction for a user.

The (digital) pen sensor 854 may be a part of the touch panel 852, or a separate sheet for recognition. The key 856, for example, may include a physical button, an optical key, or a keypad. The ultrasonic input unit 858 may allow the electronic device 800 to detect a sound wave using a microphone (e.g., a microphone 888), and determine data through an input tool generating an ultrasonic signal.

The display 860 (e.g., the display 760) may include a panel 862, a hologram device 864, or a projector 866. The panel 862 may include the same or similar configuration with the display 760 of FIG. 7. The panel 862, for example, may be implemented to be flexible, transparent, or wearable. The panel 862 and the touch panel 852 may be implemented with one module. The hologram device 864 may show a three-dimensional image in a space using interference of light. The projector 866 may project light onto a screen to display an image. The screen, for example, may be positioned in the inside or outside of the electronic device 800. According to an embodiment, the display 860 may further include a control circuit for controlling the panel 862, the hologram device 864, or the projector 866.

The interface 870, for example, may include a high-definition Multimedia interface (HDMI) 872, a USB 874, an optical interface 876, or a D-sub (D-subminiature) 878. The interface 870 may include, for example, the communication interface 770 shown in FIG. 7. The interface 870, for example, may include a mobile high definition Link (MHL) interface, an SD card/multi-media cared (MMC) interface, or an Infrared Data Association (IrDA) standard interface.

The audio module 880 may convert a sound and an electric signal in dual directions. At least one element of the audio module 880 may include, for example, the I/O interface 750 shown in FIG. 7. The audio module 880, for example, may process sound information that is input or output through a speaker 882, a receiver 884, an earphone 886, or the microphone 888.

The camera module 891 may be a unit which is capable of taking a still picture and a moving picture. According to an embodiment, the camera module 891 may include one or more image sensors (e.g., a front sensor or a rear sensor), a lens, an image signal processor (ISP), or a flash (e.g., an LED or a xenon lamp).

The power management module 895 may manage, for example, power of the electronic device 800. The power management module 895 may include, for example, a power management integrated Circuit (PMIC) a charger IC, or a battery or fuel gauge. The PMIC may operate in wired and/or wireless charging mode. A wireless charging mode may include, for example, diverse types of magnetic resonance, magnetic induction, or electromagnetic wave. For the wireless charging, an additional circuit, such as a coil loop circuit, a resonance circuit, or a rectifier, may be further included therein. The battery gauge, for example, may measure a remnant of the battery 896, a voltage, a current, or a temperature, for example during charging. The battery 896 may measure, for example, a residual capacity, a voltage on charge, a current, or temperature thereof. The battery 896 may include, for example, a rechargeable battery and/or a solar battery.

The indicator 897 may display the following specific state of the electronic device 800 or a part (e.g., the AP 9810) thereof: a booting state, a message state, or a charging state. The motor 898 may convert an electric signal into mechanical vibration and generate a vibration or haptic effect. Although not shown, the electronic device 800 may include a processing unit (e.g., a GPU) for supporting a mobile TV. The processing unit for supporting the mobile TV, for example, may process media data that is based on the standard of digital multimedia broadcasting (DMB), digital video broadcasting (DVB), or media flow (MediaFlo™).

Each of the above components (or elements) of the electronic device according to an embodiment of the present disclosure may be implemented using one or more components, and a name of a relevant component may vary with on the kind of the electronic device. The electronic device according to various embodiments of the present disclosure may include at least one of the above components. Also, a part of the components may be omitted, or additional other components may be further included. Also, some of the components of the electronic device according to the present disclosure may be combined to form one entity, thereby making it possible to perform the functions of the relevant components substantially the same as before the combination.

The term "module" used for the present disclosure, for example, may mean a unit including one of hardware, software, and firmware or a combination of two or more thereof. A "module," for example, may be interchangeably used with terminologies such as a unit, logic, a logical block, a component, a circuit, etc. The "module" may be a minimum unit of a component integrally configured or a part thereof. The "module" may be a minimum unit performing one or more functions or a portion thereof. The "module" may be implemented mechanically or electronically. For example, the "module" according to the present disclosure may include at least one of an application-specific integrated circuit (ASIC) chip performing certain operations, a field-programmable gate arrays (FPGAs), or a programmable-logic device, known or to be developed in the future.

At least a part of an apparatus (e.g., modules or functions thereof) or method (e.g., operations or operations) according to various embodiments of the present disclosure, for example, may be implemented by instructions stored in a computer-readable storage medium in the form of programmable module.

For example, the storage medium may store instructions enabling, during execution, an operation (or operation) of allowing a processor of an electronic device to obtain a speech input and then generate a speech signal, an operation of performing first speech recognition to at least a part of the speech signal to obtain first operation information and a first confidence score, an operation of transmitting at least a part of the speech signal to a server for the second speech recognition, and an operation of receiving second operation information to the signal transmitted from the server, and functions of (1) corresponding to the first operation information if the first confidence score is higher than a first threshold, (2) providing a feedback to the first confidence score if the first confidence score is lower than a second threshold, and (3) corresponding to the second operation information if the first confidence score is between the first and second thresholds.

A module or programming module according to various embodiments of the present disclosure may include at least one of the above elements, or a part of the above elements may be omitted, or additional other elements may be further included. Operations performed by a module, a programming module, or other elements according to an embodiment of the present disclosure may be performed sequentially, in parallel, repeatedly, or in a heuristic method. Also, a portion of operations may be performed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a processor configured to perform automatic speech recognition (ASR) on a speech input by using a speech recognition model that is stored in a memory; and
   a communication module configured to transmit the speech input to a server and receive a speech instruction, which corresponds to the speech input, from the server,
   wherein the processor is further configured to:
      perform an operation corresponding to a result of the ASR if a confidence score of the result of the ASR is higher than a first threshold value, and
      provide a feedback to a user if the confidence score of the result of the ASR is lower than a second threshold value.

* * * * *